United States Patent [19]
Dittrich

[11] Patent Number: 4,942,786
[45] Date of Patent: Jul. 24, 1990

[54] CONTINUOUSLY VARIABLE TRANSMISSION SYSTEM WITH BY-PASS CHECK VALVES

[75] Inventor: Otto Dittrich, Bad Homburg, Fed. Rep. of Germany

[73] Assignee: Reimers Getriebe AG, Zug, Switzerland

[21] Appl. No.: 314,545

[22] Filed: Feb. 23, 1989

[30] Foreign Application Priority Data

May 24, 1988 [DE] Fed. Rep. of Germany ....... 3817532

[51] Int. Cl.$^5$ .................................... B60K 41/16
[52] U.S. Cl. ........................... 74/867; 474/28
[58] Field of Search .............. 74/867, 196; 474/18, 474/28

[56] References Cited

U.S. PATENT DOCUMENTS

| | | | |
|---|---|---|---|
| 4,261,213 | 4/1981 | Rattunde | 74/196 |
| 4,292,031 | 9/1981 | Rattunde | 474/28 X |
| 4,439,170 | 3/1984 | Steuer | 474/18 X |
| 4,608,031 | 8/1986 | Vahabzadeh | 474/28 |
| 4,798,561 | 1/1989 | Hattori et al. | 474/18 X |
| 4,884,997 | 12/1989 | Hattori | 474/28 |

FOREIGN PATENT DOCUMENTS 2828347  1/1980  Fed. Rep. of Germany .
2080892A 2/1982 United Kingdom .

*Primary Examiner*—Leslie A. Braun
*Assistant Examiner*—Khoi Q. Ta
*Attorney, Agent, or Firm*—Frishauf, Holtz, Goodman & Woodward

[57] ABSTRACT

To provide for rapid response of a fluid pressure element pressing conical disks towards each other, to prevent slippage of a belt (25) between the conical faces of the conical disks (3, 3', 4, 4') upon abrupt changes in torque being transmitted to the driving shaft (1; 51, 52); additional fluid supply lines (23, 24; 73, 74) with check valves therein (21, 22; 71, 72) are connected between the torque sensor (19; 69, 70) and the connecting line (11, 12; 61, 62) extending between a control valve (10; 50) and the fluid pressure arrangement, typically a cylinder-piston arrangement (5, 7, 8, 6, 9), providing axial pressure of the movable one of the conical disks, the check valves having a fluid path direction from the pressure source—torque sensor line (18; 65, 75, 218) to the control valve (10, 50)—fluid pressure arrangement line (11, 12; 61, 62) and bypassing the control valve (10; 50).

4 Claims, 2 Drawing Sheets

4,942,786

CONTINUOUSLY VARIABLE TRANSMISSION SYSTEM WITH BY-PASS CHECK VALVES

Reference to related publication, assigned to the assignee of the present application:

U.S. Pat. No. 4,261,213, Rattunde, to which German Patent 28 28 347 corresponds.

The present invention relates to a continuously variable transmission system in which pairs of conical transmission disks are hydraulically pressed against each other, so that a belt connecting the pairs will travel between the conical faces of the disks and the transmission ratio between the two pairs of disks can be varied by changing the spacing between the conical disks.

BACKGROUND

The transmission force or torque transmission capability of continuously variable double-cone type transmissions is determined, to some extent, by the engagement pressure between the lateral faces of a transmission belt and the engaging conical faces of the cone disks. It is known to utilize hydraulic pressure to engage a movable cone disk against one side of the transmission belt chain, or other transmission medium, for short and generically, hereinafter "belt", the other side of the belt then engaging against a facing conical side of the other one of the conical disks of the pair, which acts as a counter element. To provide hydraulic pressure, a control valve is connected to a cylinder-piston arrangement which acts axially with respect to the movable conical disk. A torque sensor is interposed in the driving shaft to sense the transmitted torque and, in dependence thereon, permits drainage of the pressure fluid or blockage thereof, or drainage under throttled conditions, in accordance with transmitted torque, so that the engagement pressure of the disks is maintained at a predetermined level. The torque sensor also permits control of valves to add a predetermined volume of hydraulic pressure fluid into the system from a hydraulic pump.

U.S. Pat. No. 4,261,213, to which German 28 28 347 corresponds, describes such a continuously variable transmission system in detail, and also describes a suitable torque sensor. As well known, a transmission of this type can be constructed with torque sensors located both on the driving shaft as well as on the driven shaft. This is particularly suitable if the characteristic of the shafts is changeable, which, for example, may occur when a dynamo electric machine drives a first shaft, and a dynamo electric machine is coupled to the second shaft which, for example when current is disconnected from the machine driving the first shaft, can act as a generator for dynamic braking, or to feed back mechanical energy to the dynamo electric machine on the first shaft, for generation of electrical energy, for example recharging of a battery. The operation of the respective shafts, thus, can change, and either shaft can be a driving shaft or a driven shaft.

Infinitely variable transmissions are sensitive to slippage of the belt with respect to the cone disks. Slippage may occur, for example, upon abrupt changes in loading. To prevent slippage, the torque sensor, as known, reacts to change in torque by increasing the supply pressure available. This is done by throttling drainage from the hydraulic system, which is a closed loop, until the basic pressure of the hydraulic system corresponds to the value required to transfer the torque applied to the driving shaft. The system is so arranged that, upon rapid or abrupt change in loading, the torque sensor not only completely closes drainage or return flow from the system to a pump but, additionally, pumps a certain predetermined volume of pressure fluid back into the hydraulic loop system.

The torque sensor, as known, is placed in that portion of the loop of the hydraulic which is in the path of the return flow of the hydraulic fluid. Thus, if the torque sensor is to increase the quantity of fluid which is in the pressurized portion of the loop, it must do so via the hydraulic control valve. The hydraulic control valve, usually, is an axially shiftable spool valve. Such spool valves inherently include throttling regions so that the response time of the hydraulic pressure fluid system is unduly long upon abrupt changes in applied torque. Further, long connecting lines of the pressure medium and a plurality of flow resistance regions and throttling locations cause a delay in the build-up of pressure upon abrupt changes in torque. The system requires the placement of throttling gaps or diaphragm holes in the supply lines; further, the construction of the spool valve itself, and particularly of a four-edge type spool valve, introduces throttling points which retard the build-up of pressure upon change in torque. Upon sensing of a sudden change or abrupt rise in torque, which may occur for example in a vehicular variable transmission upon commanded change of speed, the quantity or volume of pressurized fluid and available from the torque sensor to enhance the pressure in the pressure portion of the system must flow through the control valve and the supply lines from the control valve to the cylinder-piston arrangements of the conical disks, which also means through the various throttling positions and flow resistance connections as well as the long flow lines. As a result, the required volume of pressurized fluid, and the volume of pressurized fluid supplied by the torque sensor, reaches the cylinder-piston arrangement of the movable disk only with some delay with respect to the increase in torque.

The effect of the delay can be expressed as high throttling of hydraulic fluid between the torque sensor and the cylinder-piston arrangement, in effect the decrease of application pressure between the conical disks. In a transmission, and for example in an automotive transmission, there then will be gap of compressive force between the conical disks acting on the belt, which may lead to slippage of the belt with respect to facing conical surfaces of the disks. Slippage of the belt may have serious consequences, since the belts, which may have metal reinforcements, may cause irreparable damage to the disks, or may become irreparably damaged themselves. Usually, slippage may result in localized evaporation of lubricants, resulting in local overheating at incremental areas of the belt and/or the conical faces where the belt and the conical faces contact each other. This, then, changes the design parameters of the frictional engagement between belt and conical disks and may cause, particularly at the conical disks, localized changes in hardness of the disks, or loss of surface hardening, resulting in loss of resistance to wear and formation of grooves in the faces of the disks—which should be smooth.

THE INVENTION

It is an object to improve the hydraulic system so that the response time between changes in applied torque and pressure of the axially slidable cone-face disk is substantially reduced; especially, increase of pumped fluid volume in the system of operation by the torque sensor, or increase in pumping effort of the pump which provides the operating pressure, should not be necessary. Preferably, the change in the system should be such that existing systems can be retrofitted with the improvement in accordance with the invention.

Briefly, the fluid supply to the fluid pressure arrangement, for example a cylinder-piston arrangement, is rapidly changed to eliminate previously occurring time delays due to flow resistances in the fluid supply loop, by providing additional fluid supply lines and check valves so placed that the additional fluid supply lines are connected between a connection line from the control valve, which is connected to a source of fluid pressure, for example the pump sensor and a connection line between the control valve and the cylinder-piston fluid pressure arrangement. The check valve or valves is/are so connected that it has a fluid path direction from the valve—torque sensor line to the control valve—fluid pressure arrangement line, thereby bypassing the control valve.

The pressure fluid, preferably, is an incompressible fluid, such as a hydraulic fluid, typically hydraulic pressure oil.

The bypass lines with the check valves permit bypassing the hydraulic path from the torque sensor through the valve and supplying pressurized fluid by the shortest possible path to the cylinder-piston pressure arrangement, thereby also bypassing various throttling positions of the valve, or actually included throttles or diaphragms. The result is a substantial decrease in the response time of the cylinder-piston arrangement to changes in torque, and the danger of slippage between the belt and the conical disks is thereby effectively eliminated. Any rapid, for example steep or abrupt rise in torque is, effectively simultaneously, coupled with an increase of pumped pressurized fluid to the cylinder—piston arrangement, so that the engagement pressure, likewise, is effectively simultaneously increased.

Interconnection of the pressure line with the pressure receiving arrangement, with a check valve interposed, is simple and permits placement of the lines such that they are short. Desirably, the additional interconnecting line, together with the check valve which, preferably, is spring-loaded, can be integrated in the form of bores in existing housing structures or the like.

The check valves are so oriented that they open only when the pressure in the return lines is higher than in the supply lines—increase in pressure in the return line being caused, for example, by shutting off the return flow upon sensing of increased torque by the torque sensor.

In accordance with a feature of the invention, each one of the cylinder-piston arrangements has an individual interconnecting line and check valve associated therewith. One of the supply lines may be constructed as a central bore in one of the transmission shafts. One of the torque sensors can then be coupled directly with the hydraulic piston-cylinder arrangement. In such a system, the other shaft and conical disk combination requires, however, an additional interconnecting line with the check valve, since either one of the cylinder-piston arrangements must react rapidly.

If the transmission, based on its use, has only defined driving shafts and driven shafts, only a single torque sensor is necessary; if, however, based on use of the transmission, the shafts can alternately act as driving or driven shafts, a situation which occurs for example in an electrically driven vehicle which in braking or downhill operating mode uses a driving dynamo electric machine not as a motor but, rather, as a generator, torque sensors must be applied on both of the shafts. In dependence on the flow direction of power between the shaft, only that one of the torque sensors which, at a respective instant of time, operates as the driving shaft is activated, and is hydraulically connected to the pressure arrangement, for example the cylinder-piston arrangement pressing the axially movable conical disk towards the other, with the belt interposed. An automatically acting switch-over valve can be provided; such a switch-over valve, by itself, and its operation is known, see for example, the aforementioned U.S. Pat. No. 4,261,213.

DRAWINGS, ILLUSTRATING EXEMPLARY EMBODIMENTS

FIG. 1 is a highly schematic system diagram in which a hydraulically operated infinitely variable transmission is shown with a control valve and a torque sensor on the driving shaft. Some of the elements, for better understanding, are shown in section; and FIG. 2 is a schematic diagram in which the function of the shafts can be interchanged, so that either shaft can be a driving shaft or a driven shaft.

DETAILED DESCRIPTION

The basic system, known from the prior art (see U.S. Pat. No. 4,261,213) will first be described.

Figure 1:
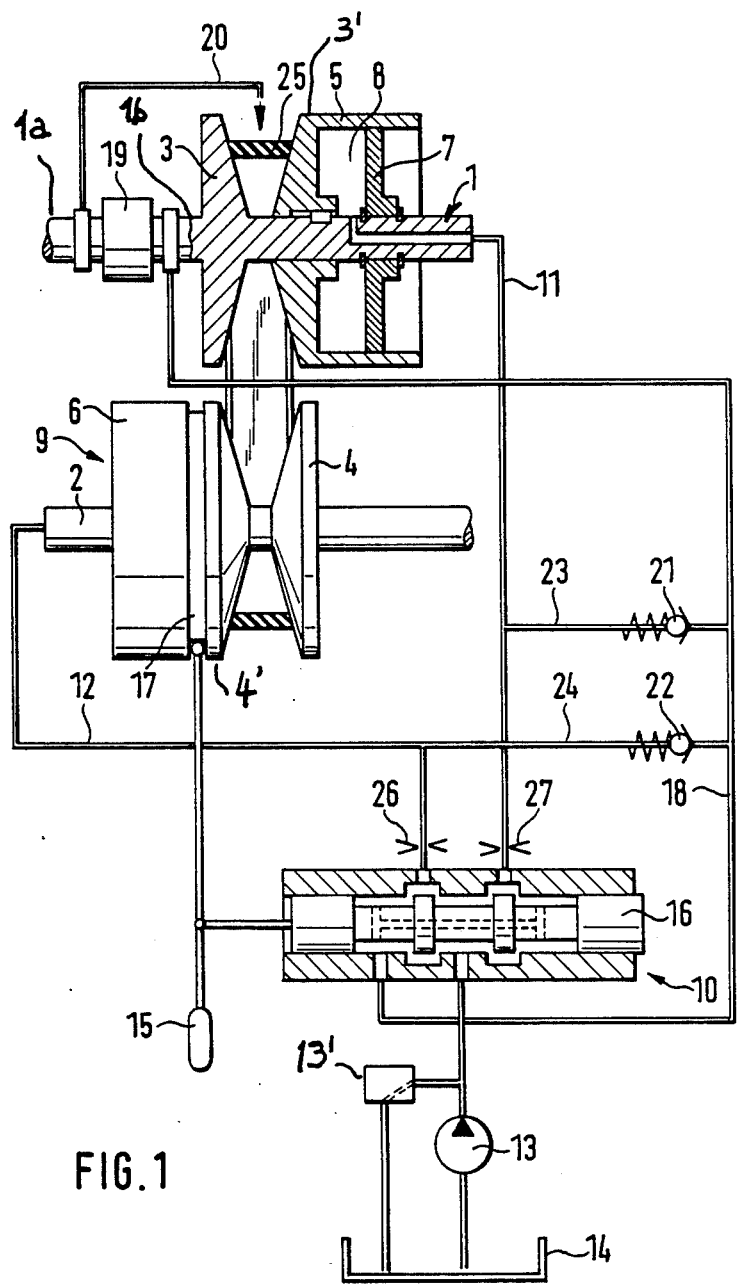

Referring to FIG. 1, the infinitely variable transmission includes a driving shaft 1 and a driven shaft 2. Conical disks 3, 4 are secured to the shafts 1, 2 to rotate therewith and to be axially fixed on the shaft. Opposite conical disks 3', 4' are placed on the shaft, to rotate with the shaft but to be axially slidable. The disks 3', 4' have a cylindrical extension 5, 6, forming, together with a piston 7 therein, a piston-cylinder combination. The piston 7 is rigidly secured to the respective shaft, to rotate therewith, and to be axially fixed thereon. A connecting belt 25 runs between the disks 3, 3' and 4, 4'. To engage the belt 25 at predetermined radial positions, and to change the transmission ratio, pressurized hydraulic fluid is supplied to the cylinder spaces 8, 9 of the cylinders via a four-shoulder or four-edge spool type control valve 10 and lines 11, 12. Diaphragms or throttles 26, 27 are interposed in the respective valve-cylinder lines 11, 12 in order to limit the speed of adjustment or change of transmission ratio, and to dampen the positioning movement of the movable disk cylinders 3', 5 and 4', 9.

A control lever 15 is coupled with a slider or spool 16 of the valve 10. Its free end engages in a groove 17 of the cylinder 6. The other end is the operating end, for operation for example by hand. The position of the control lever 15 determines the transmission ratio. Since the lever 15 is coupled both to the slider 16 of the spool valve 10 as well as to the cylinder, a closed control loop is provided. For example, if the transmission would have the tendency to change from the transmission ratio set by hand, the control lever 15, by engagement in the groove 17, will then cause shifting of the spool 16 in a direction which, as well known, tends to change the fluid supply from the spool valve to rebalance the transmission to remain in the predetermined position and transmission ratio. If the transmission ratio is to be changed, manual operation of the control lever 15 will change, manually, the position of the slider and of the cylinder until the desired transmission ratio is obtained and a new position, in balance, will result.

The spool 16 of the valve 10, as shown, is continuously deflected somewhat from its central position. This connects pressurized fluid from a pump 13, receiving fluid from a sump or supply 14, to a lines 11 and 12. The driven shaft 2 receives the pressure which is in line 17; the driving shaft 1 receives a somewhat higher pressure over line 11, which is due to balance requirements. The pressure in the line 18 forms the base pressure of the overall system and is determined by a torque sensor 19. The torque sensor 19 receives the pressure fluid from line 18, as derived from valve 10, and maintains the pressure in line 18 at the required level in dependence on the torque to be transferred. The torque sensor 19 has a drain connection so that, over line 20, pressure fluid can flow freely back to the supply or sump 14; alternatively, it can be used in the system, for example for lubrication, before being returned to sump 14.

The torque sensor 19 is known, and described, for example, in U.S. Pat. No. 4,261,213. Basically, the shaft 1. has two coaxial portions 1a, 1b. Portion 1a, for example, is the driving portion and may be coupled to a rotating power source. The portions 1a, 1b are coaxial, and can slightly rotate with respect to each other, while being relatively axially fixed with respect to each other. Relative rotation of the portions 1a, 1b causes radial deflection of a sensing element, for example a ball operating in facing cam tracks, cut into facing flanges splined to the shaft portions. The radial displacement of the sensing element controls application of pressurized fluid in such a manner that the engagement pressure between the displacement or sensing element and the flanges is changed until equilibrium is established, thereby varying the fluid pressure as fluid passes from line 18 through the torque sensor 19 to the drain line 20.

The torque sensor is so constructed that, if an extreme quantity of pressurized fluid is required, for example for short periods of time after the torque sensor has sensed an increase in torque and completely blocked drainage through line 20, additional pumped fluid is returned into line 18.

In accordance with the present invention, additional fluid supplylines, forming interconnecting lines 23, 24, with check valves 21, 22 therein, are connected between the line 18, which is connected through valve 10 to the source 13, and fluid pressure lines 11, 12 from the control valve 10 to the cylinders 8, 9, and hence directly to the fluid pressure or fluid engagement.

OPERATION

Upon overload, and return of pressure fluid through line 18 to the valve 10, pressurized brake fluid can flow through the check valves 21, 22 and the bypass lines 23, 24 directly from line 18 to the cylinder-piston arrangements 5, 7, 8 and 6, 9, respectively. This direct flow of pressure fluid bypasses the valve control ports of the valve 10 and the throttles or diaphragms 26, 27. The bypass valves and bypass lines between the lines 18 and 11 as well as between 18 and 12, respectively, have a comparatively weak counter or holding spring and are so arranged that they open only when the pressure level in the line 18 is higher than in the respective line 11 or 12. The return flow and higher pressure in line 18 is caused by blocking of the drainage line 20 from the torque sensor 19. Although pump 13 may not be able to supply additional pressure fluid, and/or the reaction, in view of the throttling effect of valve 10 and throttles 26, 27, may be slow, sudden torque pulses will cause supply, by reverse flow of fluid through line 18, supply of additional fluid to lines 11 and 12.

Figure 2:
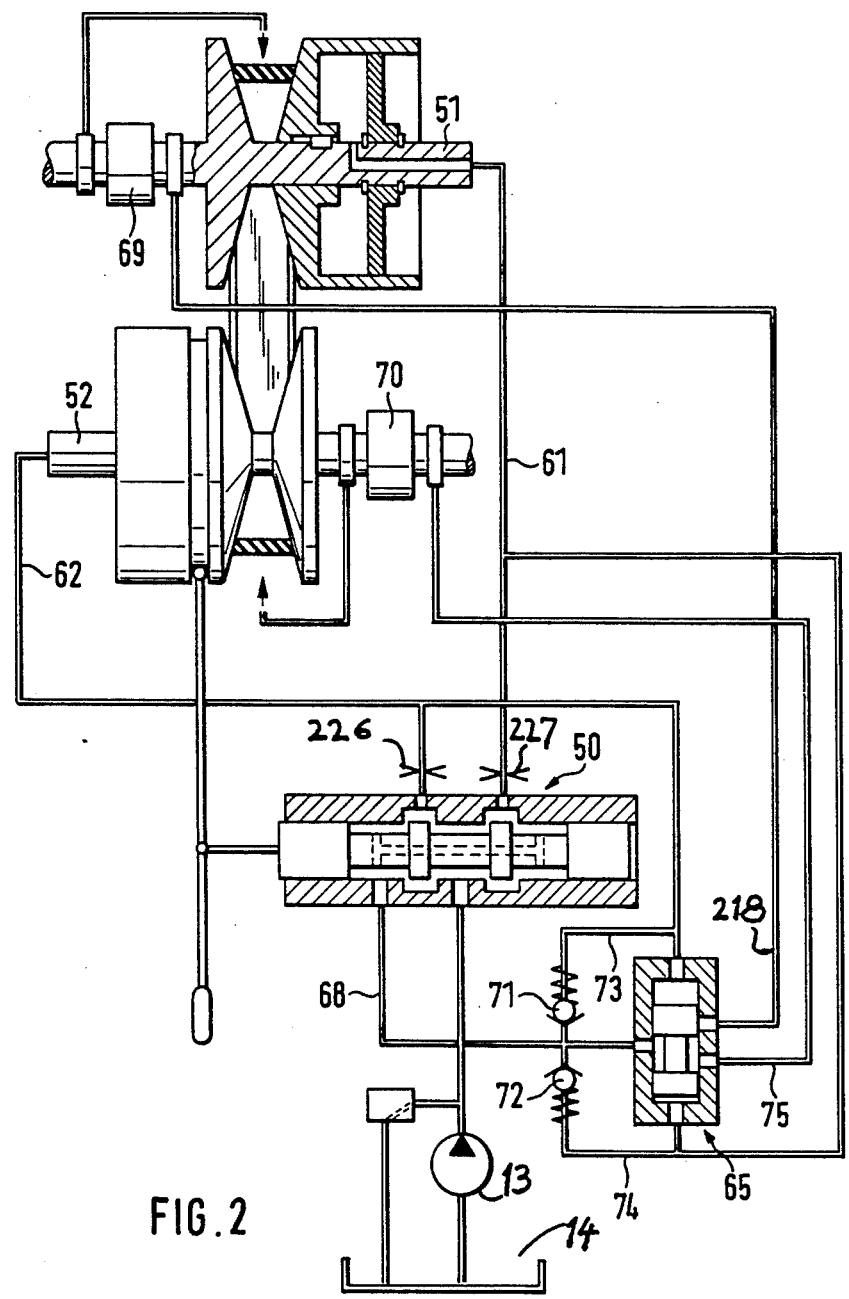

The system of FIG. 1 is entirely sufficient if the shaft 1 always is the driving shaft and the shaft 2 the driven shaft. FIG. 2 illustrates the system in accordance with the present invention if either shaft 1 or shaft 2 is the driving shaft and, conversely, either shaft 2 or shaft 1 then will be the driven shaft.

Referring now to FIG. 2: FIG. 2 illustrates the situation in which shaft 52 is the driving shaft and shaft 51 is the driven shaft. Both shafts 51, 52 have a torque sensor 69, 70 associated therewith. The torque sensor 70 is coupled via line 68 from valve 50 and connecting line 75 from switch-over valve 65 to the supply source, formed by the pump 13. At any time, only one of the torque sensors 69, 70 is activated. Thus, only two bypass lines 73, 74 and two check valves 71, 72 are necessary. In the position of the transfer valve 65 shown in FIG. 2, line 218 between the upper outlet port of the valve 65 and the torque sensor 69 does not carry pressurized fluid.

In operation of the system, sudden torque pulses permit bypassing of pressurized brake fluid from line 68, derived without intervening throttles or chokes from the pump 13 to line 74 and then through line 61 to the cylinder-piston arrangement on shaft 51, as well as through line 73 and line 62 to the cylinder-piston arrangement on shaft 52. The control valve 50, and chokes 226, 227 are bypassed.

The pressure developed by pump 13 is controlled by a pressure controller 13', as well known.

Various changes and modifications may be made and any features described in connection with any one of the embodiments may be used within the scope of the inventive concept.

I claim:

1. Continuously variable transmission system having
   a first shaft (1, 51);
   a second shaft (2, 52),
   one of said shafts forming a driving shaft and the other of said shafts forming a driven shaft;
   a pair of conical disks (3, 3'; 4, 4') on each of said shafts, said conical disks having facing conical surfaces,
   one (3', 4') of the disks of the pairs being axially movable with respect to the other;
   connecting means (25) operable between the conical surfaces of the disks and connecting the pairs of the disks, and hence the driving and the driven shafts;
   fluid pressure means (5, 7, 8, 6, 9) coupled to the axially movable disk for providing axial pressure thereon to tightly frictionally engage the connecting means (25) between said conical surfaces;
   a torque sensor (19; 69, 70) on the driving shaft, the torque sensor controlling the fluid pressure in the fluid pressure means (5, 7, 8, 6, 9) in dependence on torque being transferred between the driving shaft and the associated pair of conical disks; and
   a fluid circulating loop including a source of fluid pressure (13), a control valve (10, 50), the fluid pressure means (5, 7, 8, 6, 9), the torque sensor (19; 69, 79), a fluid sump or drain (14, 20) and connecting lines
   (a) between the source of fluid pressure (13) and the control valve (10, 50);
   (b) (11, 12; 61, 62) between the control valve (10; 50) and the fluid pressure means (5, 7, 8, 6, 9);

(c) (18; 65, 75, 218) between the control valve (10, 50) and the torque sensor (19; 69, 70); and (d) (20) between the torque sensor and the fluid sump or drain, wherein the pressure and fluid flow through said lines (c) and (d) is representative of torque being transferred through said transmission system, and comprising, in accordance with the invention, a rapid supply means for rapidly changing the fluid pressure applied to the fluid pressure means (5, 7, 8, 6, 9) without subject to time delays due to flow resistances in said loop, said rapid supply means including additional fluid supply lines (23, 24; 73, 74) and check valves (21, 22; 71, 72) included in said additional fluid supply lines, said additional fluid supply lines (23, 24; 73, 74), with the check valves (21, 22; 71, 72) therein, being connected (e) between the line (18, 65, 75, 218) connecting the control valve (10, 50) and the torque sensor (19; 69, 70) with the connecting line (11, 12; 61, 62) between the control valve (10; 50) and the fluid pressure means (5, 7, 8, 6, 9) to supply additional fluid under pressure to the fluid pressure means upon sensing of increased torque transfer in said system and consequent decreased or blocked fluid flow through connecting line (d) (20) between the torque sensor and the fluid sump or drain, the check valves having a fluid path direction from the torque sensor line control valve (18; 65, 75, 218) to the control valve-fluid pressure means line (11, 12; 61, 62) and bypassing the control valve (10; 50).

2. The system of claim 1, wherein the pressure fluid is a hydraulic fluid and the source of fluid pressure (13) is a hydraulic pump.

3. The system of claim 1, wherein each of the hydraulic fluid pressure means (5, 7, 8, 6, 9) is supplied with pressure fluid from said control valve through an individual supply line (11, 12; 61, 62);

and wherein an individual one of said additional fluid supply lines (23, 24; 73, 74) with the check valves (21, 22; 71, 72) therein are coupled to said individual fluid supply lines.

4. The system of claim 1, wherein either of the first or second shafts (51, 52) is the driving shaft, and hence the second or first shafts then will be the driven shaft;

said system further including a change-over valve (65) having a common inlet coupled to the control valve (50) and connecting line (c) and directing pressurized fluid so that one of the torque sensors (69, 70) which is on that one of the shafts forming the driving shaft; and wherein the additional fluid supply lines (73, 74) with the check valves (71, 72) therein are connected to the common inlet of the change-over valve (65).

* * * * *